United States Patent
Balluchi (10) Patent No.: US 12,072,761 B2
(45) Date of Patent: Aug. 27, 2024

(54) MEMORY SUB-SYSTEM ADDRESSING FOR DATA AND ADDITIONAL DATA PORTIONS

(71) Applicant: Micron Technology, Inc., Boise, ID (US)

(72) Inventor: Daniele Balluchi, Cernusco sul Naviglio (IT)

(73) Assignee: Micron Technology, Inc., Boise, ID (US)

( * ) Notice: Subject to any disclaimer, the term of this patent is extended or adjusted under 35 U.S.C. 154(b) by 140 days.

(21) Appl. No.: 17/831,436

(22) Filed: Jun. 2, 2022

(65) Prior Publication Data

US 2023/0393930 A1 Dec. 7, 2023

(51) Int. Cl.
*G06F 11/10* (2006.01)
*G06F 3/06* (2006.01)

(52) U.S. Cl.
CPC ........ *G06F 11/1004* (2013.01); *G06F 3/0619* (2013.01); *G06F 3/0659* (2013.01); *G06F 3/0688* (2013.01)

(58) Field of Classification Search
CPC .. G06F 11/1004; G06F 3/0619; G06F 3/0659; G06F 3/0688
See application file for complete search history.

(56) References Cited

U.S. PATENT DOCUMENTS

| | | | |
|---|---|---|---|
| 8,793,290 B1 | 7/2014 | Pruthi | |
| 10,282,294 B2 | 5/2019 | Chang | |
| 10,504,591 B2 | 12/2019 | Qawami | |
| 11,360,701 B1* | 6/2022 | Vijayrao | G06F 3/0676 |
| 2004/0168012 A1* | 8/2004 | Tsai | G06F 12/0653 711/E12.085 |
| 2010/0202276 A1* | 8/2010 | Ikeda | G11B 20/1217 |
| 2011/0093653 A1* | 4/2011 | Lee | G06F 12/0246 711/E12.001 |
| 2014/0101490 A1* | 4/2014 | Cronin | G06F 11/1004 714/42 |
| 2015/0363106 A1* | 12/2015 | Lim | G06F 13/1694 711/167 |
| 2016/0328156 A1* | 11/2016 | Swarbrick | G06F 13/4234 |
| 2019/0079678 A1* | 3/2019 | Malladi | G06F 15/7821 |
| 2020/0019515 A1* | 1/2020 | Koufaty | G06F 12/0862 |

(Continued)

*Primary Examiner* — Albert Decady
*Assistant Examiner* — Enamul M Kabir
(74) *Attorney, Agent, or Firm* — Brooks, Cameron & Huebsch, PLLC (57) ABSTRACT

Systems, apparatuses, and methods related to addressing for data and additional data portions are described herein. In an example method, addressing for data and additional data portions can include accessing data written to a memory device in response to receipt of a first command configured according to a nondeterministic memory interface protocol. The first command can be a compute express link (CXL) protocol compliant command. The example method can further include converting an address associated with the first command to a second command configured according to a standardized deterministic memory interface protocol. The second command can be a DRAM accessible command. The example method can further include accessing a page of memory cells of the memory device in which the data is written, and in which additional data portions associated with the data are written using the converted address associated with the first command.

18 Claims, 8 Drawing Sheets

(56) References Cited

U.S. PATENT DOCUMENTS

| | | | |
|---|---|---|---|
| 2021/0200470 A1* | 7/2021 | Chan | G06F 3/0656 |
| 2021/0286727 A1* | 9/2021 | Bains | G06F 12/0882 |
| 2021/0311897 A1* | 10/2021 | Malladi | G06F 3/0679 |
| 2021/0318958 A1* | 10/2021 | Pawlowski | G06F 12/0862 |
| 2022/0114128 A1* | 4/2022 | Jen | G06F 1/3237 |
| 2022/0156146 A1* | 5/2022 | Choe | G06F 3/0679 |
| 2023/0305972 A1* | 9/2023 | Trantham | G06F 9/30101 |

* cited by examiner

MEMORY SUB-SYSTEM ADDRESSING FOR DATA AND ADDITIONAL DATA PORTIONS

TECHNICAL FIELD

The present disclosure relates generally to apparatuses, systems, and methods for addressing for data and additional data portions.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices can be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Systems, apparatuses, and methods related to addressing of data and additional data portions (e.g., cyclic redundancy check (CRC) data, error correction code (ECC) data, etc.) are described herein. Data stored within memory cells of a memory device can be located using an address. The address of the data can correlate to a location within a group of memory cells, a page, a portion of a memory array, etc. In some examples, the data can be associated with a command configured according to a nondeterministic memory interface protocol, such as a compute express link (CXL) command, and the command (e.g., a CXL command) can be associated with a particular size of data (e.g., 64 bytes). When locating data in a memory device (such as a DRAM memory device, or a low power DRAM memory device), cycle redundancy check (CRC) data may be associated with the data in order to protect the integrity of the data. The CRC data can add an offset to an entry of data (such as a 64 byte entry, as is associated with CXL commands) and therefore make it difficult to maintain an address that correlates to an exponent or factor of two (2). Further, ECC data can be used to correct the data.

For example, an entry of data can include data that is 64 bytes in size (referred to as an "entry") and CRC data associated with the data entry that is 4 bytes in size. In this example, a single entry can be associated with a size of 68 bytes (the data plus the CRC data), which would be more complicated to calculate an address for as 68 bytes does not store evenly into a page of data (e.g., 2,048 bytes of data) or other portions of data that typically are a factor or exponent of two (2). As a page of data can be an amount of data accessed in a single access (e.g., read or write operation), storing entries within a page size to include the data and the CRC data is helpful.

A cyclic redundancy check (CRC) refers to an error-detecting code commonly used in digital networks and storage devices to detect accidental changes to raw data. Blocks of data entering these systems can get a short check value attached, based on a remainder of a polynomial division of their contents. On retrieval, the calculation can be repeated and, in the event the check values do not match, corrective action can be taken against the data corruption. CRCs can be used in error correction systems to detect errors. Further, CRCs can be so-called because the check (data verification) value is a redundancy (it expands the message without adding information) and can be based on cyclic codes. CRCs can be used because they are simple to implement in binary hardware, easy to analyze, and particularly good at detecting common errors cause by noise in transmission channels. Because the check value has a fixed length, the function that generates can be used as a hash function.

In addition, sectors in the memory array can be created in order to accommodate channel throughput and still transfer a same amount of data as when CRC data is not factored into the total storage space. In some examples, and as will be described further below, a sector can include 512 entries where each page includes 30 entries (in addition to 2 bytes of CRC data and/or metadata). However, 512 entries do not split evenly into a page (as 512 does no divide evenly into 30) so these sectors will have an offset number and other determinations in order to determine a location of a portion of data. In some previous approaches, additional address bits can be used to handle these offsets and uneven distribution due to the inconsistency between a CXL command and corresponding data size and a DRAM (e.g., low power DDR memory device) and CRC data size (e.g., a page of data). As will be described herein, a number of address bits less than those used in prior approaches can be used to determine a location of the portion of data without adding additional data expense (such as storage and data transfer time).

As used herein, a "set of memory cells" or "set" refers to a physical arrangement of memory cells such as a row of memory cells or a portion of a row of memory cells, among other possible configurations of memory cells. As used herein, a "row of memory cells" or "row" refers to an arrangement of memory cells that can be activated together (e.g., via access lines). Each row can include a number of pages. As used herein, the term "page" and "pages of memory cells" can be interchangeably used. As used herein, a "page" refers to a unit of programming and/or sensing (e.g., a number of memory cells that are programmed and/or sensed together as a functional group). In some embodiments each row (or a subset of a row) can comprises one page of memory cells.

In some embodiments, the memory system can be a Compute Express Link (CXL) compliant memory system (e.g., the memory system can include a PCIe/CXL interface). CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the peripheral component interconnect express (PCIe) infrastructure, leveraging PCIe physical and electrical interfaces to provide advanced protocol in areas such as input/output (I/O) protocol, memory protocol (e.g., initially allowing a host to share memory with an accelerator), and coherency interface. In some embodiments, the CXL technology can include a plurality of I/O lanes configured to transfer the plurality of commands to or from circuitry external to the memory controller at a rate of around thirty-two (32) giga-transfers per second. In another embodiments, the CXL technology can comprise a peripheral component interconnect express (PCIe) 5.0 interface coupled to a plurality of I/O lanes, wherein the memory controller is to receive commands involving at least one of a memory device, a second memory device, or any combination thereof, via the PCIe 5.0 interface according to a compute express link memory system.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, designators such as "M," etc., for example, particularly with respect to reference numerals in the drawings, indicate that a number of the particular feature can be included. It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of sound devices) can refer to one or more sound devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context.

The figures herein follow a numbering convention in which the first digit or digits correspond to the figure number and the remaining digits identify an element or component in the figure. Similar elements or components between different figures can be identified by the use of similar digits. A group or plurality of similar elements or components can generally be referred to herein with a single element number. For example, a plurality of reference elements 203-0, . . . 203-M (e.g., 203-0 to 203-M) can be referred to generally as 203. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Figure 1:
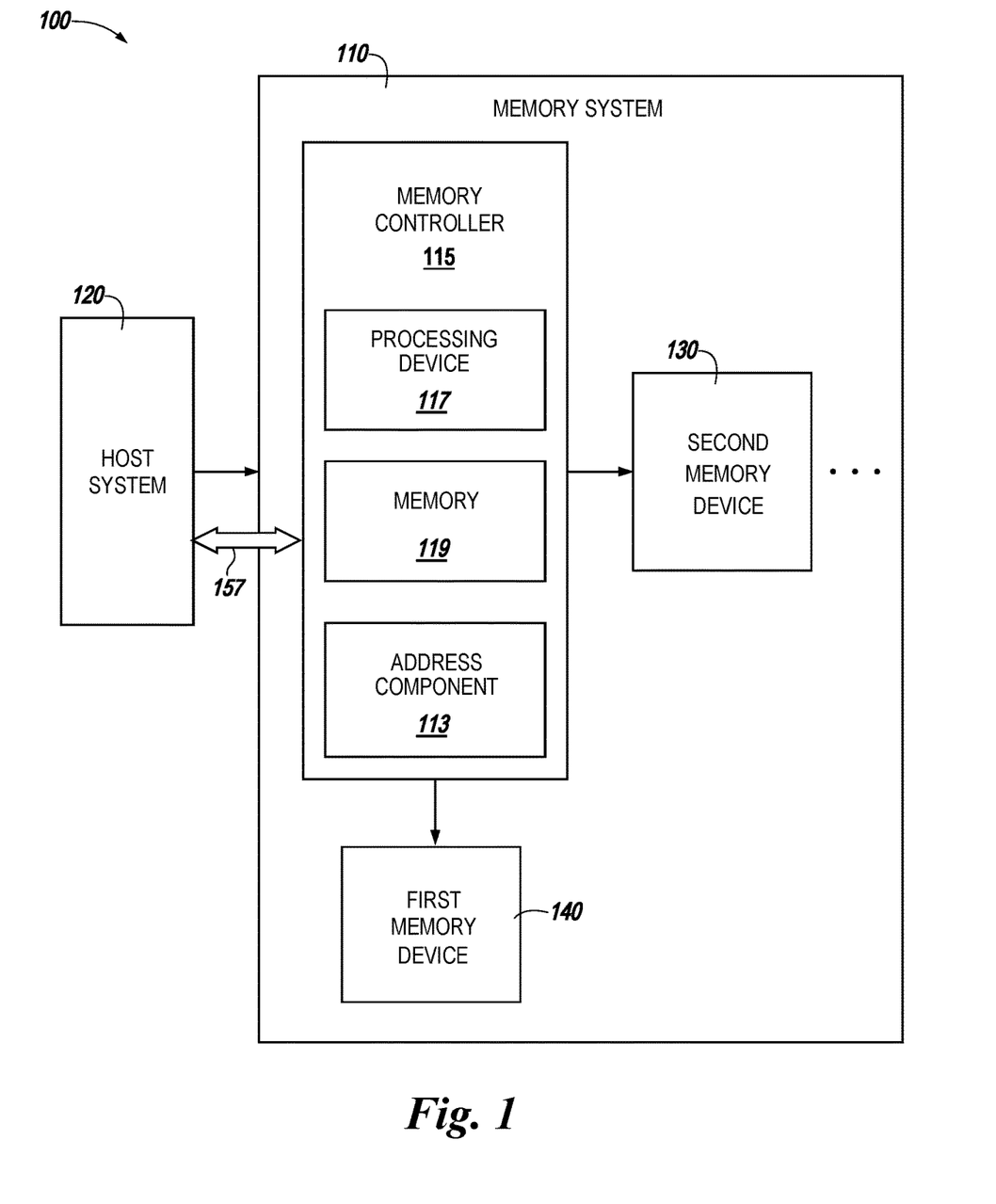
FIG. 1 illustrates an example computing system that includes a memory system in accordance with a number of embodiments of the present disclosure.

FIG. 1 illustrates an example computing system 100 that includes a memory system 110 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In some embodiments, the computing system 100 can include a memory system 110 including a memory controller 115 and memory devices 130, 140. The computing system 100 can be coupled to a host system 120.

In some embodiments, the memory controller 115 can be configured to manage a DRAM memory device. The memory devices 130, 140 can provide main memory for the computing system 100 or could be used as additional memory or storage throughout the computing system 100. In some embodiments, the memory devices 130, 140 can be a ferroelectric field-effect transistor (FeFET) memory device. In another embodiment, the memory devices 130, 140 can be a dynamic random-access memory (DRAM), ferroelectric random-access memory (FeRAM), or a resistive random-access memory (ReRAM) device, or any combination thereof. The memory devices 130, 140 can include one or more arrays of memory cells, e.g., volatile and/or non-volatile memory cells. In various embodiments, the memory devices 130, 140 can include at least one array of volatile memory cells. Embodiments are not limited to a particular type of memory device. For instance, the memory devices can include RAM, ROM, DRAM, SDRAM, PCRAM, RRAM, and flash memory, among others. Although shown as two memory devices 130, 140, it will be appreciated that a single memory device or three or more memory devices, are contemplated within the scope of the disclosure.

A memory system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory systems 110. In some embodiments, the host system 120 is coupled to different types of memory system 110. As used herein, "coupled to" or "coupled with" generally refers to a connection between components, which can be an indirect communicative connection (e.g., with intervening components) or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., a dynamic memory controller), and a storage protocol controller (e.g., PCIe controller, SATA controller). The host system 120 uses the memory system 110, for example, to perform a command. As used herein, the term "command" refers to an instruction from a memory system to perform a task or function. For example, the memory controller 115 of the memory system 110 can cause a processing device 117 to perform a task based on a given command. In some embodiment, a command can include a memory request. That is, a command can be a request to read and/or write data from and/or to the memory device (e.g., second memory device 130 and/or first memory device 140). The host system 120 may, for example, write data to the memory system 110 and read data from the memory system 110 based on a command (e.g., memory request).

The host system 120 can be coupled to the memory system 110 via a physical host interface. Examples of a physical host interface include, but are not limited to, a serial advanced technology attachment (SATA) interface, a peripheral component interconnect express (PCIe) interface, Compute Express Link (CXL) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory system 110. The host system 120 can further utilize an interface to access components (e.g., memory devices 130, 140) when the memory system 110 is coupled with the host system 120 by the PCIe interface. The physical host interface can provide an interface for passing control, address, data, and other signals between the memory system 110 and the host system 120. In general, the host system 120 can access multiple memory systems via a same communication connection, multiple separate communication connections, and/or a combination of communication connections.

In various embodiments, the memory controller 115 may generate status information, which may be transferred to or from host system 120, for example via the sideband channel 157. The sideband channel 157 may be independent of (e.g., separate from) a double data rate (DDR) memory interface and/or a non-volatile memory express (NVMe) interface that may be used to transfer (e.g., pass) DDR commands and/or NVM commands between the host system 120 and the memory device 110. That is, in some embodiments, the sideband channel 157 may be used to transfer commands to cause performance of bit vector operations from the host system 120 to the memory device 110 while a control bus (not illustrated) is used to transfer DRAM commands and/or NVM commands from the host system 120 to the memory device 110. The memory devices 130, 140 can include any combination of the different types of non-volatile memory devices and/or volatile memory devices. Examples of volatile memory devices can be, but are not limited to, random access memory (RAM), such as dynamic random-access memory (DRAM) and synchronous dynamic random-access memory (SDRAM).

Some examples of non-volatile memory devices can include, but are not limited to, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130, 140 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130, 140 can be grouped as pages that can refer to a logical unit of the memory device used to store data. In some embodiments, pages of memory cells can be comprised of one or more rows of memory cells. In addition, a row of memory cells can be comprised of one or more sets of memory cells.

The memory controller 115 (or controller 115 for simplicity) can communicate with the memory devices 130, 140 to perform operations such as reading data, writing data, or erasing data at the memory devices 130, 140 and other such operations. The memory controller 115 can include hardware such as one or more integrated circuits and/or discrete components, a buffer memory, or a combination thereof. The hardware can include digital circuitry with dedicated (i.e., hard-coded) logic to perform the operations described herein. The memory controller 115 can be a microcontroller, special purpose logic circuitry (e.g., a field programmable gate array (FPGA), an application specific integrated circuit (ASIC), etc.), or other suitable processor.

While the example memory system 110 has been illustrated in FIG. 1 as including the memory controller 115, in another embodiment of the present disclosure, a memory system 110 does not include a memory controller 115, and can instead rely upon external control (e.g., provided by an external host, or by a processor or controller separate from the memory system).

In general, the memory controller 115 can receive commands or operations from the host system 120 and can convert the commands or operations into instructions or appropriate commands to achieve the desired access to the memory device 130 and/or the memory device 140. The memory controller 115 can be responsible for other operations such as wear leveling operations, garbage collection operations, error detection and error-correcting code (ECC) operations, encryption operations, caching operations, and address translations between a host address (e.g., host physical address (HPA)) and a device address (e.g., device physical address (DPA)) that are associated with the memory devices 130, 140. The memory controller 115 can further include host interface circuitry to communicate with the host system 120 via the physical host interface. The host interface circuitry can convert the commands received from the host system into command instructions to access the second memory device 130 and/or the first memory device 140 as well as convert responses associated with the second memory device 130 and/or the first memory device 140 into information for the host system 120.

The memory system 110 can also include additional circuitry or components that are not illustrated. In some embodiments, the memory system 110 can include a cache or buffer (e.g., DRAM) and address circuitry (e.g., a row decoder and a column decoder) that can receive an address from the memory controller 115 and decode the address to access the second memory device 130 and/or the first memory device 140.

The memory sub-system 110 includes an address component 113 that can be configured to orchestrate and/or perform operations to perform addressing operations and can use various components, data paths, and/or interfaces of the memory sub-system 110 to be enabled to do so. The address component 113 can include various circuitry to facilitate determining a location to read and/or write portions of memory by using address data associated with the memory cells of the memory devices 130, 140. For example, the address component 113 can include a special purpose circuitry in the form of an ASIC, FPGA, state machine, and/or other logic circuitry or software and/or firmware that can allow the address component 113 to orchestrate and/or perform data storage operations related to accessing data and CRC data in memory cells in order to protect data integrity and communicate to various components, data paths, and/or interfaces of the memory sub-system 110.

The address component 113 can be communicatively coupled to the memory devices 130, 140 and can access the memory device 130, the memory device 140, internal data paths of the memory sub-system 110, and/or interfaces of the memory sub-system 110 to perform the operations described herein and/or to transfer storage data to additional elements of the memory sub-system 110.

In some embodiments, the memory sub-system controller 115 includes at least a portion of the address component 113. For example, the memory sub-system controller 115 can include a processor 117 (processing device) configured to execute instructions stored in local memory 119 for performing the operations described herein. In some embodiments, the address component 113 is part of the host system 110 (not illustrated), an application, or an operating system.

As discussed herein, the memory system 110 can receive commands from a host 120 to access a portion of data. In some examples, the command can be a CXL command and can be associated with 64 bytes of data. Due to the size of this portion of data, the addressing of the data and/or its storage can be correlated to this data size in the memory system 110 (e.g., the memory device 130, 140). As an example, each data entry can be 64 bytes and a particular number of entries can be stored per page. For example, 30 entries consisting of 64 bytes can be stored in a page (totaling 1,920 bytes) and 128 bytes of CRC data and/or metadata can be stored in the page and associated with the other 30 entries of that page of data (totaling 2,048 bytes or 2 kB with both the data and the CRC data in the page).

Further, for example, in some embodiments, the memory controller 115 can receive a first command (e.g., a CXL command or CXL compliant command) associated with a set of memory cells correlating to a data unit size for a CXL command (e.g., 64 bytes) in a memory device (e.g., the second memory device 130 and/or the first memory device 140) including a plurality of sets of memory cells corresponding to respective portions of an array of memory cells of the memory. The command can be associated with a request to read data (e.g., read request) from the memory system 110 or a request to write data (e.g., write request) to the memory system 110. The memory controller 115 can activate the set of memory cells to perform a memory access of the memory responsive to the command. For example, the memory controller 115 can cause the set of memory cells to activate to write data to a memory device. Similarly, the memory controller 115 can cause the set of memory cells to activate to read data stored on a memory device. As used herein, the term "activate" refers to the act of opening a row, set, and/or page to permit a read and/or write of data to the row, set, and/or the page once opened. For example, one or more row access commands can be asserted on a row, set, and/or page of memory cells to cause data (e.g., charges) stored by the memory cells to be read by circuitry associated with the memory device.

Figure 2:
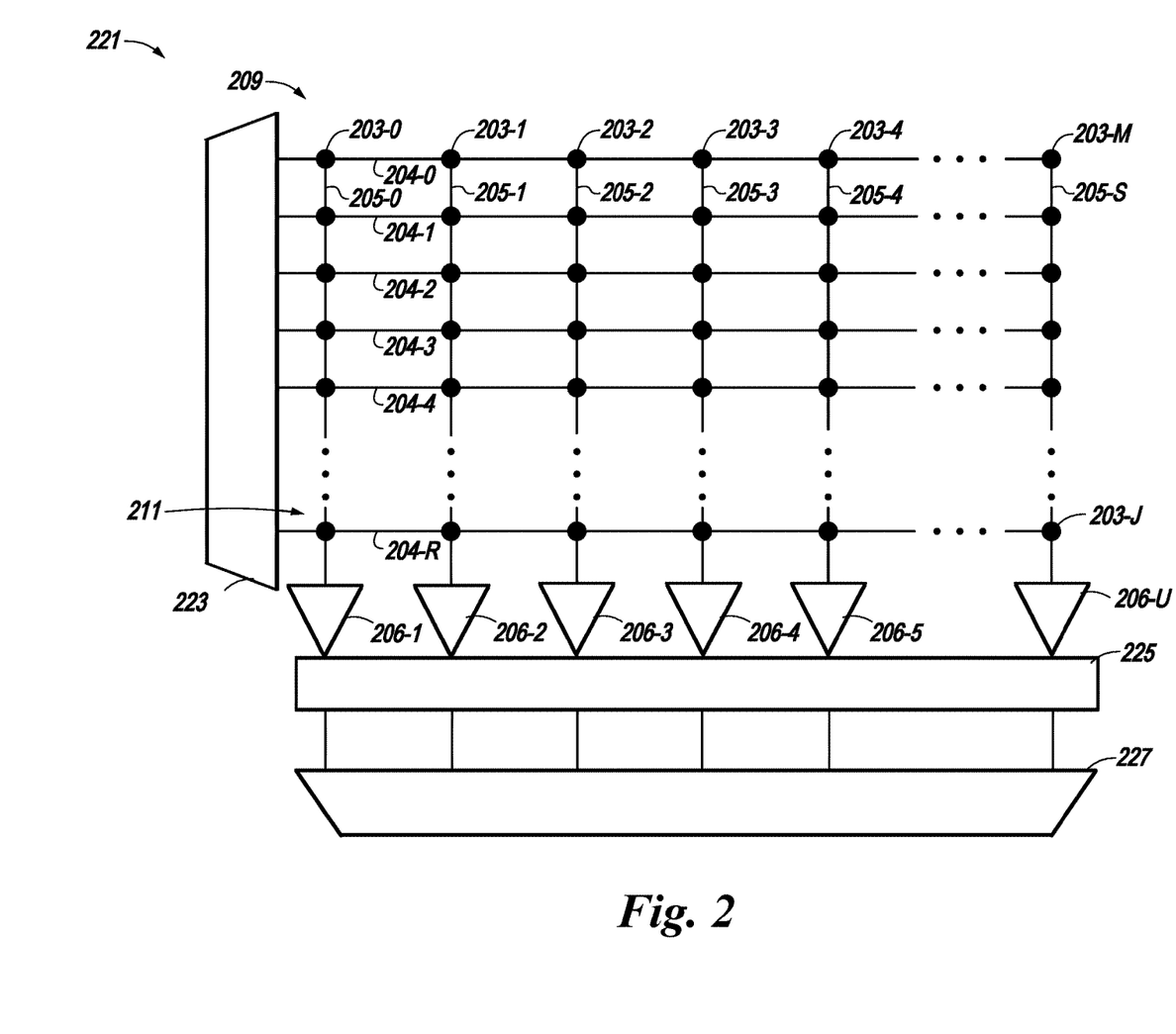
FIG. 2 illustrates an example functional diagram that includes memory cells arranged in rows in accordance with a number of embodiments of the present disclosure.

FIG. 2 illustrates an example functional diagram 221 that includes memory cells arranged in rows in accordance with a number of embodiments of the present disclosure. The functional diagram 221 can be used in connection with the computer system (e.g., the computer system 100 of FIG. 1). The functional diagram 221 can be within a number of memory devices (e.g., such as the memory devices 130, 140 in FIG. 1). The functional diagram can include an array 209 of memory cells 203-0 to 203-M, a row decoder 223, a row buffer 225, a plurality of sense amplifiers 206-1 to 206-U, and a multiplexer 227.

The array 209 includes memory cells (referred to generally as memory cells 203, and more specifically as 203-0 to 203-J) coupled to rows of access lines 204-0, 204-1, 204-2, 204-3, 204-4, 204-5, 204-6, . . . , 204-R (referred to generally as access lines 204) and columns of sense lines 205-0, 205-1, 205-2, 205-3, 205-4, 205-5, 205-6, 205-7, . . . , 205-S (referred to generally as sense lines 205). Further, the array 209 of memory cells is not limited to a particular number of access lines and/or sense lines, and use of the terms "rows" and "columns" does not intend a particular physical structure and/or orientation of the access lines and/or sense lines. Although not pictured, each column of memory cells can be associated with a corresponding pair of complementary sense lines.

Each column of memory cells can be coupled to a number of respective sense amplifiers 206-0, 206-1, 206-2, 206-3, 206-4, 206-5, 206-6, 206-7, . . . , 206-U coupled to the respective sense lines 205-0, 205-1, 205-2, 205-3, 205-4, 205-5, 205-6, 205-7, . . . , 205-S. Each of the respective sense amplifiers 206 are coupled to a row buffer 225 used to store the data accessed from the memory cells 203. As an example, the memory cells 203 can be selectively activated through decode lines to transfer data sensed by respective sense amplifiers 206-0 to 206-U to the row buffer 225.

In some embodiments, a memory controller (such as the memory controller 115 in FIG. 1) can receive a first command and initiate a first activation on a first row of cells coupled to access line 204-0. The activation of the first row of cells can initiate a memory access of one or more memory devices. As used herein, activation of a row can include activation of all the rows or an activation of a subset of the rows. For instance, activation of a row can include activating all transistors of each cell 203-0, 203-1, 203-2, 203-3, 203-4, . . . , 203-M in a row or can include activating some but not all transistors on a row (a subset of cells 203-0 to 203-M). Activation of a row (or similarly activation of a subset of a row) can permit information to be stored on or accessed from the row.

In some embodiments, as illustrated in FIG. 2, a multiplexer 227 can be used to select particular data in the row buffer 225 that corresponds to a column of cells. As an example, a row address can be input to the row decoder 223 to indicate which row to access and a column address can be input to the multiplexer 227 to indicate which data associated with a column in the row buffer 225 to select so that particular data from a particular cell can be selected. The selected data can be transferred out of the multiplexer 227.

Figure 3A:
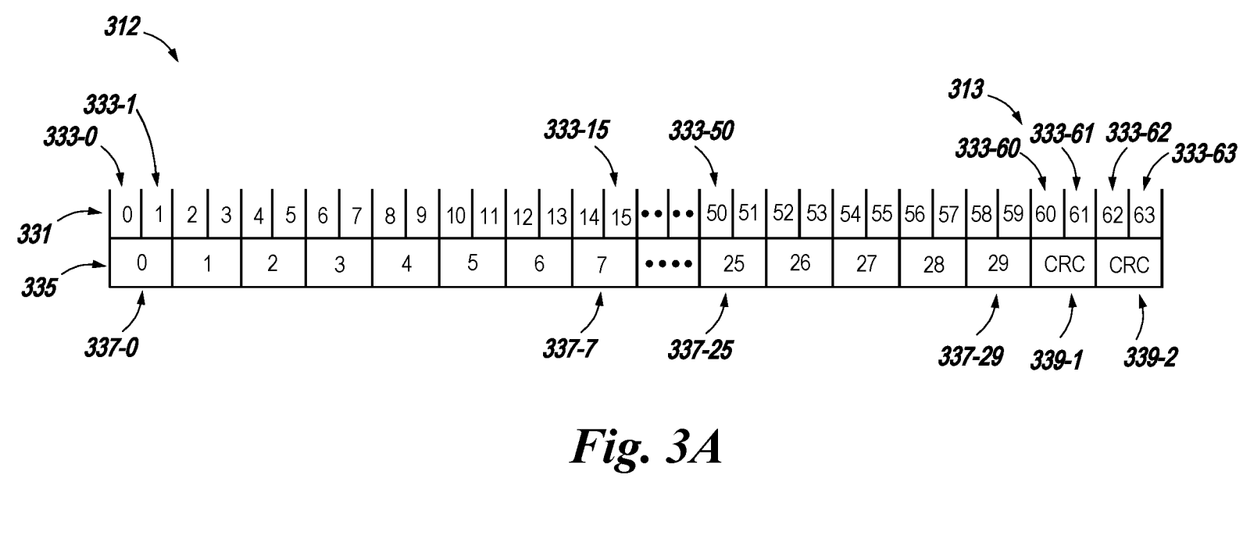
FIG. 3A is an example functional diagram that includes a row of memory cells including entries in accordance with a number of embodiments of the present disclosure.

FIG. 3A is an example functional diagram 312 that includes a row of memory cells 335 including entries 337 in accordance with a number of embodiments of the present disclosure. The row of memory cells 335 can store, in this example, thirty (30) entries of data, e.g., a $0^{th}$ entry ("0") of data 337-0 to a $29^{th}$ entry ("29") of data 337-29 and a CRC portion of data 313. While illustrated as not including some entries, it is to be appreciated that the $7^{th}$ entry 337-7 to the $25^{th}$ entry 337-25 is continuous (indicated by the dotted lines). A column address row 331, for illustration purposes of FIG. 3A, includes a number of column addresses 333 can range from a $0^{th}$ column address ("0") 333-0 to a $63^{rd}$ column address ("63") 333-63. Each column address can represent 32 bytes of information whereby two column addresses are used for a single entry. For example, a $0^{th}$ column address 333-0 and a $1^{st}$ column address 333-1 are used for the $0^{th}$ entry of data 337-0.

As is illustrated in FIG. 3A, there are 30 entries of data 337 and two entries of cycle redundancy check (CRC) data 339-1, 339-2, where each of these are 64 bytes in size. The total length of the illustrated row 335 is therefore 2,048 bytes (or 2 kB). Likewise, as there are 64 column addresses 333 and each are 32 bytes, the total number of column address space is also 2,048 bytes (or 2 kB).

Figure 3B:
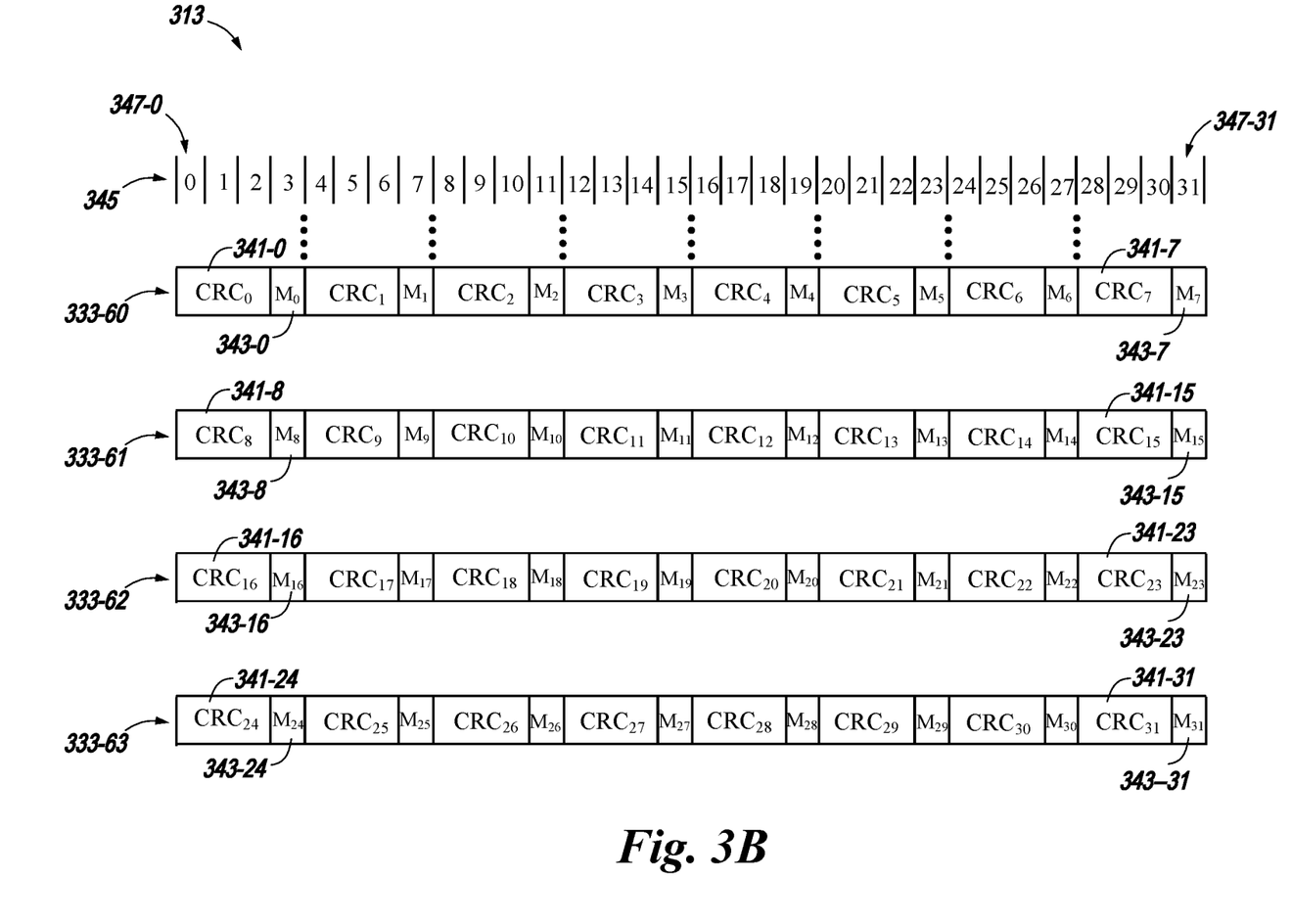
FIG. 3B is an example functional diagram that includes portions of CRC data associated with entries in accordance with a number of embodiments of the present disclosure.

FIG. 3B is an example functional diagram that includes portions of CRC data 313 associated with entries in accordance with a number of embodiments of the present disclosure. The portions of CRC data 313 in FIG. 3B can correlate to the portions of CRC data 312 in FIG. 3A. The first row 333-60 of CRC data includes the $0^{th}$ 341-0 to $7^{th}$ 341-7 portion of CRC data and corresponds to the CRC data stored at column address 333-60 of FIG. 3A. Further, the second row 333-61 of CRC data includes the $8^{th}$ 341-8 to $15^{th}$ 341-15 portion of CRC data and corresponds to the CRC data stored at column address 333-61 of FIG. 3A. The third row 333-62 of CRC data includes the $16^{th}$ 341-16 to $23^{rd}$ 341-23 portion of CRC data and corresponds to the CRC data stored at column address 333-62 of FIG. 3A. The fourth row 333-63 of CRC data includes the $24^{th}$ 341-24 to $31^{st}$ 341-31 portion of CRC data and corresponds to the CRC data stored at column address 333-63 of FIG. 3A.

A row of byte positions 345 indicates a byte position for the CRC data within each CRC portion 341. As an example, the $0^{th}$ portion of CRC data 341-0 is stored across the $0^{th}$ 347-0 through $2^{nd}$ 347-2 byte positions, indicating that the portion of CRC data 341-0 is 3 bytes in length. Further, this $0^{th}$ portion of CRC data 341-0 is associated with metadata 343-0 that is one byte in length. While illustrated as being 3 bytes in length, the CRC data can range from 24 bits (3 bytes) to 28 bits. Further, while illustrated as being one byte in size, the metadata can range from 4 bits to 8 bits (corresponding to whether the size of the CRC data is fewer or more bits/bytes). In this way, the CRC data and metadata is stored at an end of a page of data and each portion of CRC data corresponds to (and protects the integrity of) an entry of data. Also, as is illustrated in FIG. 3B, the last two portions of CRC data 343-30 and 343-31 are not connected to an entry of data as there are only 30 entries in FIG. 3A), and can be reserved for other purposes.

Figure 4A:
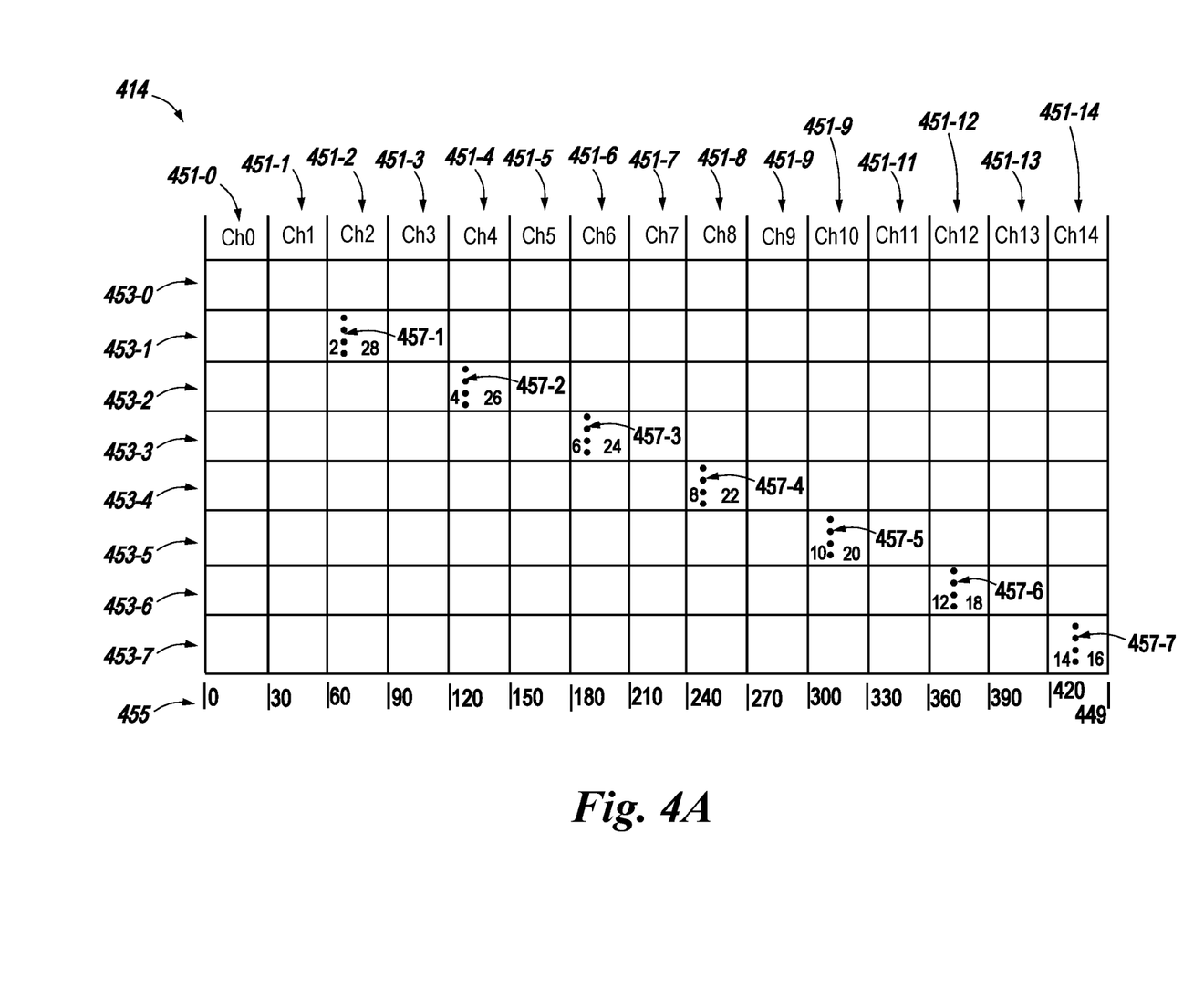
FIG. 4A is an example portion of a memory array associated with sectors in accordance with a number of embodiments of the present disclosure.

FIG. 4A is an example portion 414 of a memory array associated with sectors in accordance with a number of embodiments of the present disclosure. The portion of the memory array 414 can include a number of rows of memory cells 453-0 to 453-7 (hereinafter referred to collectively as rows of memory cells 453). Each of the rows of memory cells 453 can include a channel, such as a $0^{th}$ Channel 451-0 to a $14^{th}$ Channel 451-14, used to transfer data to the location. A page of data can be stored in each of the rows of memory cells 453 that corresponds to a particular channel. For example, a first page of data can be stored in a row 453-0 at a channel 451-0, a second page of data can be stored in a row 453-0 at a channel 451-1, etc. In this way, there are 15 pages of data stored across the first row 453-0.

While illustrated as including 15 channels (e.g., channels 0 451-0 to 14 451-14), examples may not be so limited. For example, a $16^{th}$ channel (which could extend just past channel 14 451-14 in the illustration) could be used to store corresponding parity data. While the $15^{th}$ channel could be stored adjacent to the $14^{th}$ channel 451-14 in the configuration of logical data and store the parity data adjacent to the $14^{th}$ channel 451-14, the physical storage of the parity data may differ. Each of the channels have a channel offset 455, which increases by an increment of 30 from the $0^{th}$ channel 451-0 to the $14^{th}$ channel 451-14. As an example, the $0^{th}$ channel 451-0 has an offset of "0," the $1^{st}$ channel 451-1 has an offset of "30," etc., which indicates a quantity of entries that precede the channel, such that there are 30 entries before channel 451-1, 60 entries before channel 451-2, etc., For example, since some parity values are accessed multiple times and in a repeated fashion, the channel to which it is physical stored can be scrambled for a more uniform utilization. This can be achieved by using a bitwise XOR of logical channel bits and for data row address bits (e.g., DDR row address bits). Therefore, the parity data corresponding to the first row 453-0 may be physically stored in this $15^{th}$ channel (and logically in the $15^{th}$ channel) and the parity data corresponding to the second row 453-1 may be physically stored in the $14^{th}$ channel (and logically still in the $15^{th}$ channel). Further, the parity data corresponding to the third row 453-2 may be physically stored in the $13^{th}$ channel (and logically still in the $15^{th}$ channel), and so forth down through each of the rows 453.

In this 16 channel architecture described above with one channel being used for parity bits (and the 15 channels illustrated and described further in FIG. 4A used for data entries and CRC data), a RAID stripe architecture can be used. The RAID stripe can include 15 data entries and a parity entry. The data and parity entries can have 64-bytes of data, CRC bits, and metadata bits. The metadata bits can include: 2-bit Meta0, 1-bit host poison bit, 1-bit device poison bit. The 16 entries of a RAID stripe can be spread across the 16 channels, therefore 16 different memory devices can be used. Entries of a given RAID stripe can be addressed with a same chip select, bank address, row address, and column address.

In reference to poison bits, data received (e.g., to a memory system) from a host can be incorrect or corrupted. Such incorrect or corrupted data may be referred to as "poison data." A poison data unit (e.g., bit) can be used to indicate whether the received data is poison data. The poison data unit can be received, for example, as part of a write command. As an example, a poison bit value of "1" may indicate the received data corresponding to the write command is poison data, and a poison bit value of "0" may indicate that the received data corresponding to the write command is not poison data. Embodiments are not so limited. For instance, a poison bit value of "1" could be used to indicate poison data and a bit value of "0" could be used to indicate the data is not poison data. A host poison bit may indicate that data from a host is corrupt and/or a device poison bit may indicate that data stored in a device is corrupt, etc.

Due to the discrepancy between the 64 byte segments used for CXL commands and the storage of the data and CRC data being more than 64 bytes segments (e.g., 68 byte segments with the 64 bytes of data and 4 bytes of CRC data and metadata), a translation from the CXL command to the actual location within the memory device can be performed. This translation can include dividing by a multiple of 30 since there are 30 entries per page used in order to fit the extra CRC data and metadata, as is described above. However, in order to reduce the amount of dividend bits used, some address bits can be directly mapped to the memory device address bits while column addresses, channel selectors, and row bits (e.g., R[15:13]) can be calculated by performing a division. In order to perform this translation, the CXL address space can be partitioned into 7 sectors that are identified by a sector value (e.g., "sectorID").

Further, the address bit assignments are indicated by Table 1 illustrated below and can correspond to the type of physical capacity for which number/types of bits to be used for which address correlation. As is illustrated in Table 1, the three most significant address bits can be assigned to the SectorID. The following address bits can be assigned to the less significant row address bits: R[12:0] x16 mode or R[13:0] x8 mode. Then, the rank bits and bank address bits can indicate the corresponding rank and bank locations in the memory device. The CXL command requests have 64-bytes in size, so therefore bits of device physical address (e.g., DPA), e.g., DPA[5:0], are zero.

TABLE 1

Physical Capacity

| Description | 32 GB | 64 GB | 128 GB | 256 GB |
|---|---|---|---|---|
| CXL Address | DPA[34:0] | DPA[35:0] | DPA[36:0] | DPA[37:0] |
| SectorID[2:0] | DPA[34:32] | DPA[35:33] | DPA[36:34] | DPA[37:35] |
| R[12:0] x 16 mode | DPA[31:19] | DPA[32:20] | DPA[33:21] | — |
| R[13:0] x 8 mode | — | — | — | DPA[34:21] |
| Rank[1:0] | — | DPA[19] | | DPA[20:19] |
| Bank[3:0] | | | DPA[18:15] | |
| SectorEntry[8:0] | | | DPA[14:6] | |
| C[0] 64-byte address bits | | | DPA[5:0] | |

In the example of a bus (e.g., a low power DRAM memory device bus) that is x16, a lower 32 bytes can be selected or an upper 32 bytes. As an example, in x16 mode, 2 bytes are delivered at each beat. Entry 337-0 is 64 bytes in size and it is composed of 32 bytes at column address 333-0 and 32 bytes at column address 333-1. Column address 333-0 includes C[0]=0 and column address 333-1 includes C[0]=1, where C[0]=DPA[5]. The remaining nine DPA bits are assigned to a SectorEntry value. The SectorID value and the SectorEntry value determine the most significant row address bits (e.g., R[15:13] for x16 mode), the logical channel selectors (e.g., [3:0] bits to select on of the 15 channels in FIG. 4A), and a column address bit (e.g., C[5:1]). Considering the RAID and CRC overhead, the data placement efficiency is 87.5%, which accounts for the device capacity being $7/8^{th}$ of the DRAM address space. As an example, $7/8^{th}$ of the DRAM address space is used to contain 64-byte DPA data. The SectorEntry value selects one of the 512 entries for a sector, for any give DPA[n-3:15] bits. These 512 entries are distributed sequentially along 15 logical channels (e.g., channels 451-0 to 451-14) while the last logical channel (not illustrated) is reserved for the parity data. While examples described herein refer to a particular bus width, any bus width can be used with a proper corresponding address bit assignment.

As is illustrated in FIG. 4A, there is a total of 450 entries per row that spans each of the channels 451 (indicated by offset 455 numbers from "0" to "440"). The 450 entries are composed of 30 entries per channel and a total of 15 channels 451 (15×30=450) which is 450 entries for a given row, bank, and rank. The portion 414 of the memory array is divided into a number of sectors, where each sector includes 512 entries. A $0^{th}$ sector spans from a beginning of the row 453-0 at the channel 451-0 to an offset 457-1 that is 62 entries from a start of the row 453-1 (a "2" to the left of the offset 457-1 indicates there are two 64-byte data portions from the $2^{nd}$ channel 451-2 in the $1^{st}$ row 453-1 in the $0^{th}$ sector and a "28" indicates that there are twenty-eight 64-byte data portions from the $2^{nd}$ channel 451-2 in the $1^{st}$ row 453-1 that are the beginning of a $1^{st}$ sector). For ease of reference Table 2 indicates an initial entry value (e.g., "EntryInit" value) which indicates an initial entry value in a row 453 for a sector.

TABLE 2

| SectorID | EntryInit |
|---|---|
| 0 | 0 |
| 1 | 62 |
| 2 | 124 |
| 3 | 186 |
| 4 | 248 |
| 5 | 310 |
| 6 | 372 |
| 7 | 434 |

The $1^{st}$ sector spans from the first offset 457-1 to a second offset 457-2, again spanning 512 entries. The $2^{nd}$ sector spans from the second offset 457-2 to a third offset 457-3. The $3^{rd}$ sector spans from the third offset 457-3 to a fourth offset 457-4. The $4^{th}$ sector spans from the fourth offset 457-4 to a fifth offset, the $5^{th}$ sector from the fifth offset 457-5 to the sixth offset 457-6, and the $6^{th}$ sector from the sixth offset 457-6 to a seventh offset 457-7. The "16" bytes to the right of the seventh offset 457-7 are extra bytes reserved for other use.

In order to determine a location of an entry, a formula can be used to eliminate the need for additional address bits. First, an index determination can be performed using the following:

```
SectorID = DPA[36:34]
EntryID = DPA[14:6]
Index = FirstEntry +Entry ID
If Index > 449 then
    Index = Index - 449
    R[15:13] = Sector ID + 1
else
    R[15:13] = Sector ID
end if
CID = Index/30
C[5:1] = Index - ChOffset = Index = 30*ChID
```

Figure 4B:
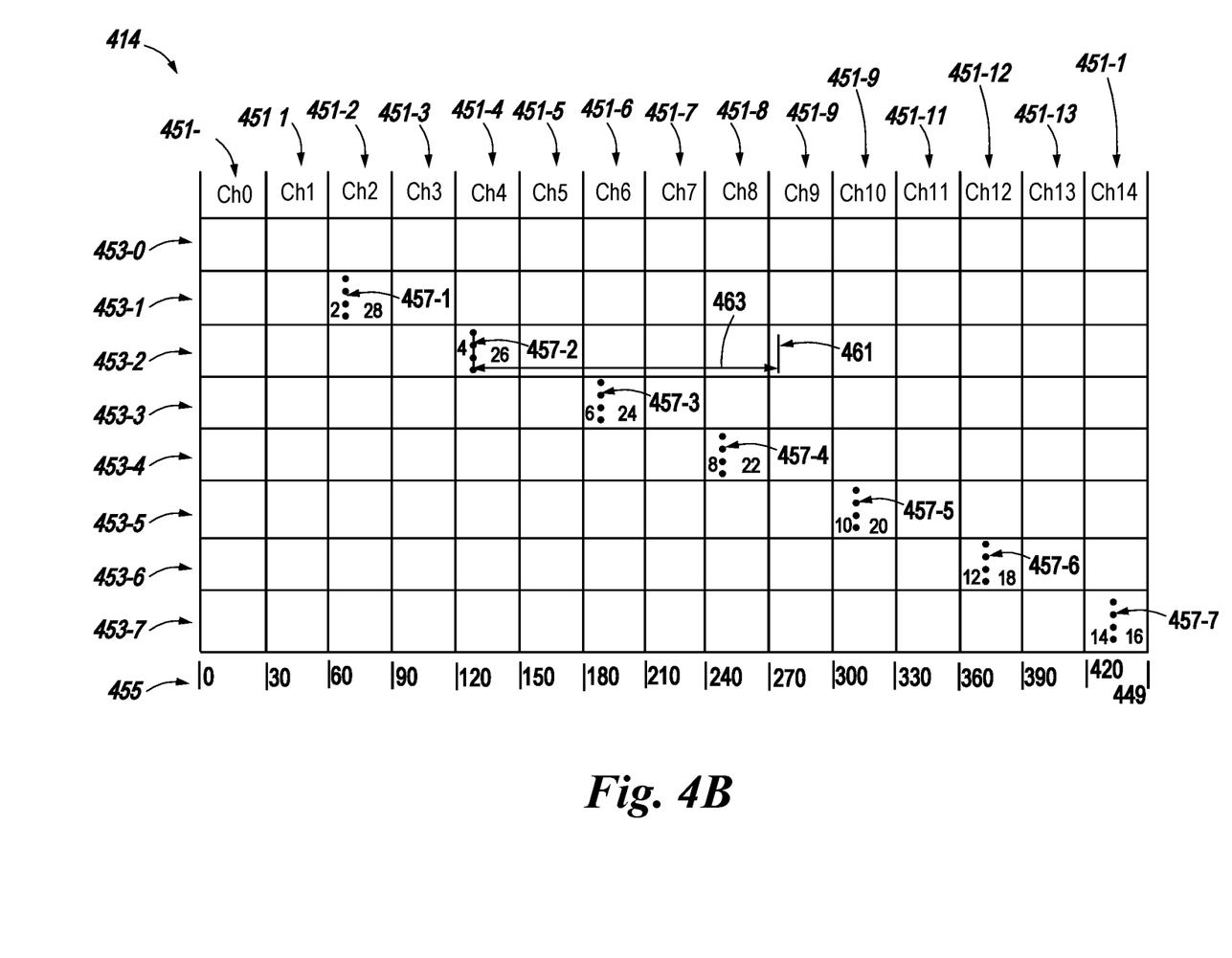
FIGS. 4B-C are each an example location of a portion of data stored in a sector in accordance with a number of embodiments of the present disclosure.
Figure 4C:
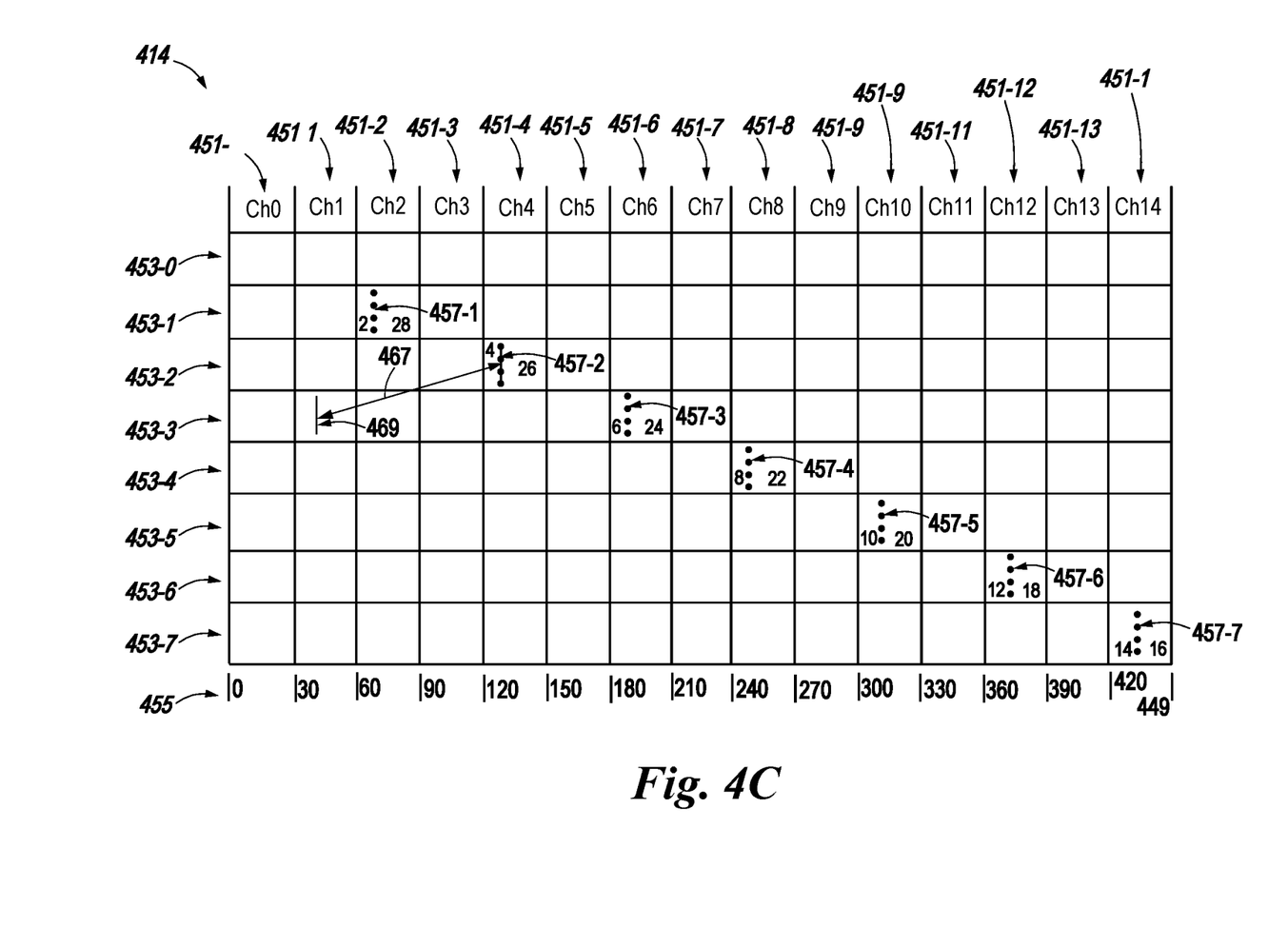

FIGS. 4B-4C are examples of using this determination with particular values for each entry location in the portion 414 of the array.

FIGS. 4B-C are each an example location of a portion of data stored in a sector in accordance with a number of embodiments of the present disclosure. The first example illustrated in FIG. 4B includes a SectorID value of 2 (e.g., SectorID=DPA[36:34]=2). The EntryID of this first example is 150 (e.g., EntryID=DPA[14:6]=150), illustrated by arrow 463. Therefore, the Index 461 in FIG. 4B is 274 (e.g., FirstEntry (Sector 2)+EntryID=124+150=274). Since the Index 461 is less than "449," the value of the row bits (e.g., R[15:13]) are used (and no incrementing of 1 is performed), and since R[15:13] indicates a row of 2 (Sector 2), row 2 453-2 is used. The channel ID (ChID) is 9 (Index/30=274/30=9). The column address to use within the channel (e.g., ChID=9) is 4 (e.g., C[5:1]=Index−ChOffset=Index−30*ChID=274-270=4). Therefore, the location of the entry is in row 2 453-2 (sector 2) and channel 9 451-9 and is 4 entries in from the start of the channel data.

The determination in formula format is described below:

```
SectorID = DPA[36:34] = 2
EntryID = DPA[14:6] = 150
Index = FirstEntry +EntryID = 124 + 150 = 274
If Index > 449 then
    Index - Index - 449
    R[15:13] - Sector ID + 1
else
    R[15:13] = Sector ID = 2
end if
CID = Index/30 = 274 / 30 = 9
C[5:1] = Index - ChOffset = Index = 30*ChID = 274 - 270 = 4
```

The second example illustrated in FIG. 4C includes a SectorID value of 2 (e.g., SectorID=DPA[36:34]=2). The EntryID of this second example is 365 (e.g., EntryID=DPA [14:6]=365), illustrated by arrow 467. Therefore, the Index 469 in FIG. 4C is 40 (e.g., the initial Index is =FirstEntry (Sector 2)+EntryID=124+365=489). Since the Index 469 is greater than "449," the Index 469 is "489-449=40" and the row is incremented by 1 (e.g., row 2 453-2 becomes row 3 453-3, as it is incremented by 1). The channel ID (ChID) is 1 (Index/30=40/30=1). The column address to use within the channel (e.g., ChID=1) is 10 (e.g., C[5:1]=Index−ChOffset=Index−30*ChID=40-30=10). Therefore, the location of the entry is in row 3 453-3 (sector 2) and channel 1 451-1 and is 10 entries over from the start of the channel data.

The determination in formula format is described below:

```
SectorID = DPA[36:34] = 2
EntryID = DPA[14:6] = 365
Index = FirstEntry +EntryID = 124 + 365 = 489
If Index > 449 then
    Index = Index - 449 = 489 - 449 = 40
    R[15:13] = Sector ID + 1 = 2 + 1 = 3
else
    R[15:13] - Sector ID
end if
CID = Index/30 = 40 / 30 = 1
C[5:1] = Index - ChOffset = Index = 30*ChID = 40 - 30 = 10
```

Figure 5:
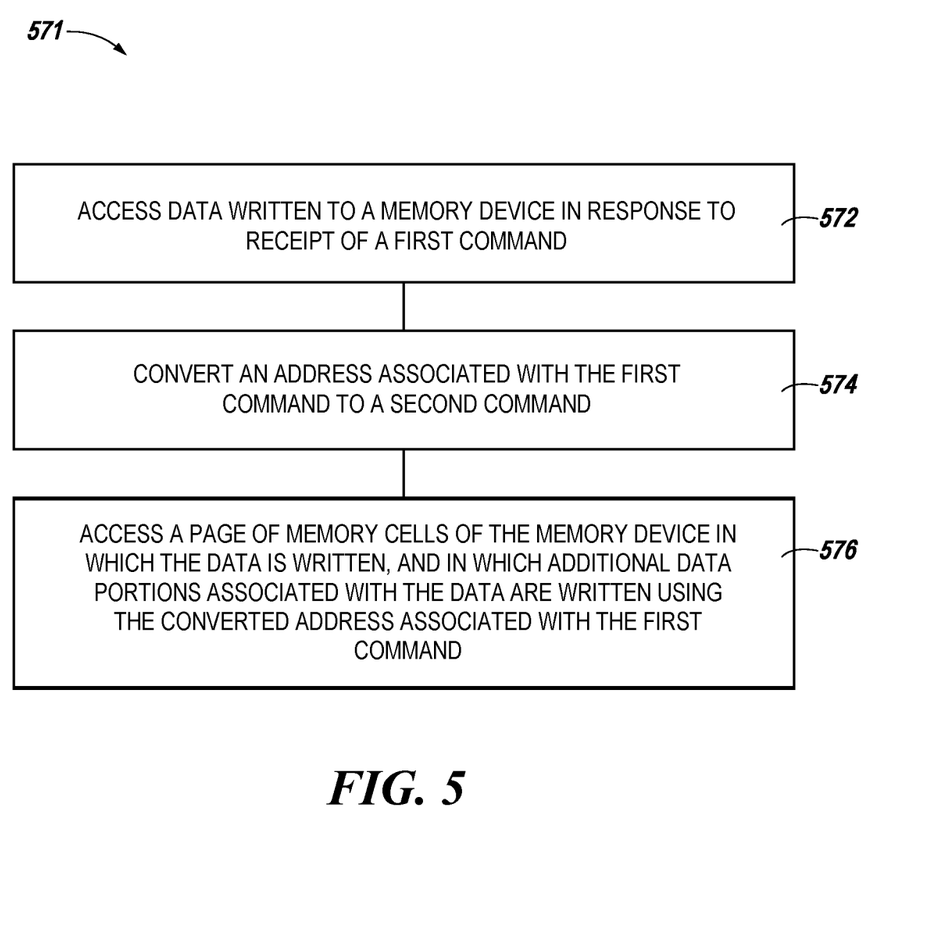
FIG. 5 illustrates a diagram representing an example method for addressing of data and CRC data in accordance with a number of embodiments of the present disclosure.

FIG. 5 illustrates a diagram representing an example method 571 for addressing of data and additional data portions (e.g., cyclic redundancy check (CRC) data, error correction code (ECC) data, etc.) in accordance with a number of embodiments of the present disclosure. In some embodiments, a computer system (e.g., the computer system 100) can include a memory controller (e.g., the memory controller 115 of FIG. 1) and a processing device (e.g., the processing device 117 of FIG. 1). The memory controller can cause the processing device to determine an address for an entry within an array of memory. In some examples, a host can send a command that is CXL-compliant to the memory device for the access.

At 572, the method 571 describes that the memory controller can access data written to a memory device in response to receipt of a first command configured according to a nondeterministic memory interface protocol, such as, for example, a compute express link (CXL) protocol compliant command. The memory device includes a plurality of sets of memory cells corresponding to respective portions of an array of memory cells of the memory device. The set of memory cells can correspond to a row of memory cells or a page of memory cells in the memory system. The memory controller can receive a command to perform read requests and/or write requests of a set of memory cells. The memory controller can activate a row of memory cells to access one or more memory devices. For example, the memory controller can apply a sensing voltage to a row of memory cells to activate a row of memory cells. In some examples, the method 571 can include converting the address associated with the first command by determining a sector in the memory device that includes the page including the data.

In some examples, the memory device can be a Compute Express Link (CXL) compliant memory device. In some examples, the method 571 can include accessing the data and corresponding additional data portions (e.g., CRC data, ECC data, etc.) in sizes of 64 bytes. In some examples, the CRC data associated with the data is 24 bits (3 bytes) in size. In some examples, metadata associated with the CRC data is within a range of 4 bits to 8 bits. In some examples, the metadata includes a host poison bit and a memory device poison bit.

At 574, the method 571 describes that the memory controller can convert an address associated with the first command to a second command configured according to a standardized deterministic memory interface protocol. For example, the second command can be a dynamic random access memory (DRAM) accessible command.

At 576, the method 571 describes that the memory controller can access a page of memory cells of the memory device in which the data is written, and in which the additional data portions (e.g., cyclic redundancy check (CRC) data, ECC data, etc.) associated with the data is written using the converted address associated with the CXL protocol compliant command. In some examples, the page comprises a plurality of portions of data, each of the plurality of portions of data being 64 bytes in size. In some examples, the plurality of portions of data are consecutively stored in the page and a plurality of portions of additional data (e.g., plurality of portions of CRC data, plurality of portions of ECC data, etc.) associated with each of the plurality of portions of data are consecutively stored in the page.

Although specific embodiments have been illustrated and as described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   accessing data written to a memory device in response to receipt of a first command configured according to a nondeterministic memory interface protocol,
      wherein the first command is a compute express link (CXL) protocol compliant command;
   converting an address associated with the first command to a second command configured according to a standardized deterministic memory interface protocol, wherein the second command is a DRAM accessible command and wherein converting the address associated with the first command comprises:
      determining a sector in the memory device that includes a page of memory cells including the data;
      assigning a sector value to identify the sector, wherein the sector comprises a number of most significant address bits, wherein the significance of the address bits is a physical capacity for which numbers and types of bits are to be used for which address correlation, and wherein the most significant address bits have the largest physical capacity; and
      assigning remaining address bits of the number of address bits to different address bit modes, wherein the different address bit modes comprise less significant address bits than the sector;
   accessing the page of memory cells of the memory device in which the data is written, and in which additional data portions associated with the data are written using the second command that comprises the converted address associated with the first command.

2. The method of claim 1, wherein:
   the data accessed is 64 bytes in size; and
   the additional data portions are cyclic redundancy check (CRC) data portions or error correction code (ECC) portions.

3. The method of claim 2, wherein:
   the additional data portions associated with the data are the CRC portions and are within a range of 24 bits to 28 bits in size; and
   metadata associated with the CRC data portions are within a range of 4 bits to 8 bits.

4. The method of claim 3, wherein the metadata comprises a host poison bit and a memory device poison bit.

5. The method of claim 1, wherein the page comprises a plurality of portions of data, each of the plurality of portions of data are 64 bytes in size.

6. The method of claim 5, wherein the plurality of portions of data are consecutively stored in the page and a plurality of portions of additional data associated with each of the plurality of portions of data are consecutively stored in the page.

7. An apparatus, comprising:
   a memory controller configured to receive a command associated with a plurality of memory cells in a memory device; and
   a processing device coupled to the plurality of memory cells, the processing device to:
      receive signaling indicative of accessing data in a page of memory cells of a memory device according to a compute express link (CXL) protocol;
      convert an address associated with the signaling to a DRAM accessible address, wherein the conversion comprises determining a sector that the page of memory cells is within, wherein converting the address associated with the first command comprises the processing device to:
      determine a sector in the memory device that includes the page including the data;
      assign a sector value to identify the sector, wherein the sector comprises a number of most significant address bits, wherein the significance of the address bits is a physical capacity for which numbers and types of bits are to be used for which address correlation, and wherein the most significant address bits have the largest physical capacity;
      assign remaining address bits of the number of address bits to different address bit modes, wherein the different address bit modes comprise less significant address bits than the sector; and
      access the page associated with the data in the sector of the memory device, wherein the data and cyclic redundancy check (CRC) data associated with the data are in the page.

8. The apparatus of claim 7, wherein the portion of data is 64 bytes in size.

9. The apparatus of claim 7, wherein the page associated with the portion of data is 2048 bytes in size.

10. The apparatus of claim 7, wherein the sector in the memory device comprises 512 entries and an entry is 64 bytes of data.

11. The apparatus of claim 10, wherein each of the 512 entries comprises at least 3 bytes of CRC data.

12. The apparatus of claim 7, wherein the memory device is a Compute Express Link (CXL) compliant memory device.

13. The apparatus of claim 7, further comprising a ferroelectric field-effect transistor (FeFET) memory device, a dynamic random-access memory (DRAM), ferroelectric random-access memory (FeRAM), or a resistive random-access memory (ReRAM) device, or any combination thereof.

14. A system, comprising:
a host to send a command configured according to a nondeterministic memory interface protocol,
wherein the first command is a compute express link (CXL) protocol compliant command;
a memory device coupled to the host, the memory device comprising:
a memory array comprising a plurality of memory cells; and
a memory controller coupled to the memory array, the memory controller to:
receive the command, wherein the command is associated with a portion of data that is 64 bytes in size;
determine a location within a page of memory and within a sector in the memory array the portion of data is in, wherein:
a sector comprises a plurality of entries of data where each of the plurality of entries comprise data and corresponding cyclic redundancy check (CRC) data:
the sector is assigned a sector value to identify the sector, when the sector comprises a number of most significant address bits, wherein the significance of the address bits is a physical capacity for which numbers and types of bits are to be used for which address correlation, and wherein the most significant address bits have the largest physical capacity;
remaining address bits of the number of address bits are assigned to different address bit modes, wherein the different address bit modes comprise less significant address bits than the sector; and
the location within the page of memory is based on a sector off-set; and
access the page of memory associated with the portion of data in the sector of the memory device.

15. The system of claim 14, wherein the sector spans at least two rows of memory cells within the memory array.

16. The system of claim 15, wherein an additional sector begins at an off-set from a beginning of a row of memory cells that the sector terminates in.

17. The system of claim 14, wherein the memory controller is to receive address bits associated with the portion of data, wherein a first portion of the address bits indicates a particular sector, a particular channel, and a particular offset associated with the location of the portion of data.

18. The system of claim 14, wherein the memory controller is to determine which channel of a plurality of channels to locate the portion of data, wherein the memory device comprises fifteen (15) channels and each page of memory in the memory array spans one of the fifteen (15) channels.

* * * * *